April 28, 1953      B. E. PREVOST      2,636,608
MAGNETIC SEPARATOR
Filed April 28, 1950
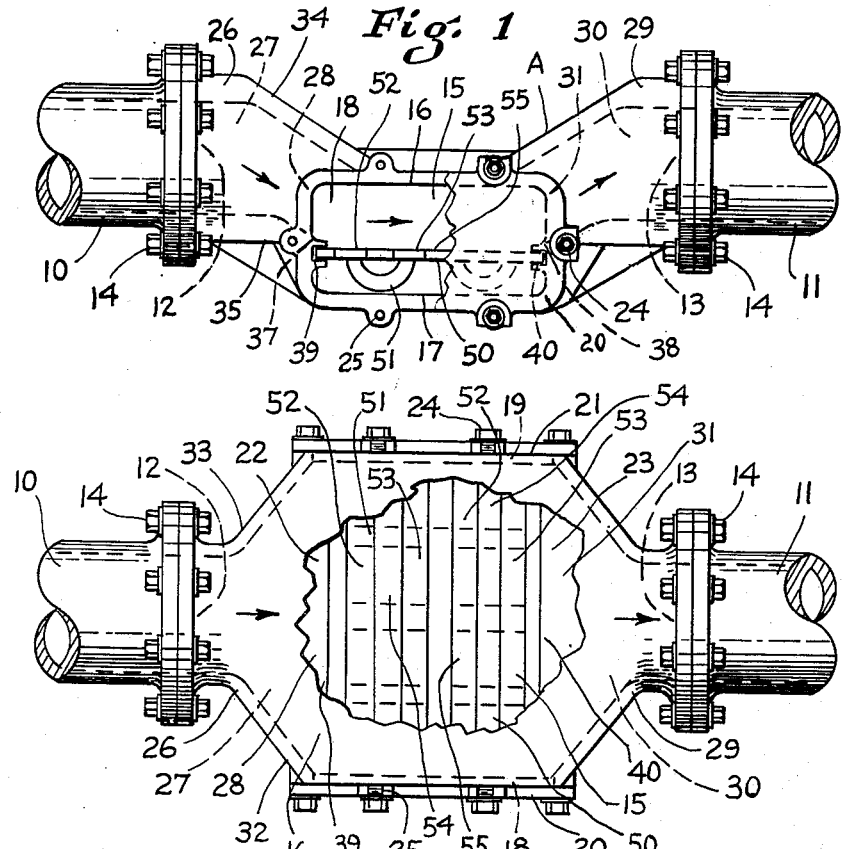
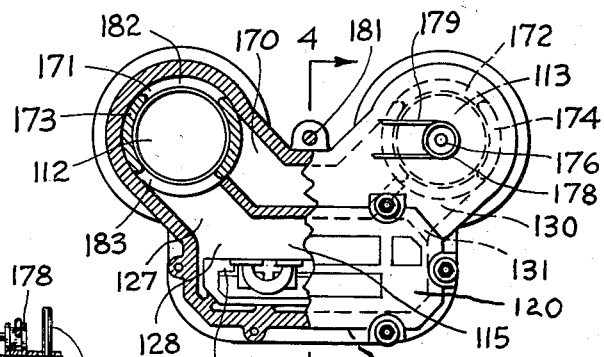
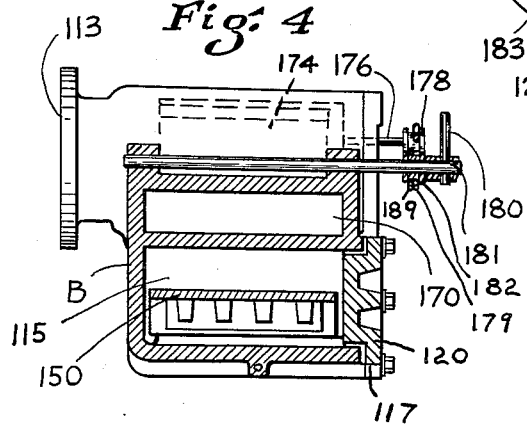
INVENTOR.
BRUNO E. PREVOST
BY
Pearson + Pearson
ATTORNEYS Patented Apr. 28, 1953

2,636,608

UNITED STATES PATENT OFFICE 2,636,608

MAGNETIC SEPARATOR

Bruno E. Prevost, North Andover, Mass., assignor to John W. Bolton & Sons, Inc., Lawrence, Mass., a corporation of Massachusetts Application April 28, 1950, Serial No. 158,675

1 Claim. (Cl. 210—1.5)

This invention relates to magnetic separators for trapping metallic particles contained in fluid as the fluid passes through a pipe system.

Heretofore magnetic separators have been constructed in which the floor of the trap compartment consists of a removable bottom plate containing magnetic bars, the non-electric magnets passing through the bottom and projecting below the separator. Since the weight of the metallic particles tends to urge them to the bottom of the pipe system, it is advantageous to have the magnetic plate form the floor rather than the top or sides of the trap compartment. However, in such installations it is difficult to remove the bottom plate for cleaning because the separator and pipes may be low and access to the bolts or other holding means is difficult.

The object of my invention is to provide an improved housing for a magnetic separator in which a magnetic plate forms a floor for the trap but the plate is entirely contained within the trap compartment and can be slidably removed for cleaning through a side opening in the compartment.

A further object of my new housing is to include entrance and exit apertures in the trap compartment which are wider and more shallow than the intake and outlet ports of the housing, thus permitting the compartment to be of restricted height over the magnetic plate.

A still further object of my device is to include within the housing as an integral part thereof, a by-pass so that the trap compartment may be shut off temporarily for cleaning of the magnetic plate, while the fluid pipe system continues in operation.

In the drawings,

Fig. 1 is a side view, partly in section, of my new magnetic separator housing.

Fig. 2 is a plan view thereof, with the top broken away to show the interior.

Fig. 3 is a side view, partly in section, of a modification of my housing which includes a by-pass and valves.

Fig. 4 is an end view in section on line 4—4 of Fig. 3.

In Figs. 1 and 2, I show the preferred form of the housing A of my new magnetic separator installed between pipes 10 and 11 of a fluid pipe system. The intake port 12 and outlet port 13 of A may be connected to pipes 10 and 11 by bolts 14, as shown; or by any other suitable means.

An elongated central trap compartment 15 is provided in A, having parallel top and bottom walls 16 and 17, openings 18 and 19 in sides 20 and 21 and ends 22 and 23. Sides 20 and 21 are cover plates and are removably retained in place by bolts 24 threaded in recesses 25 in the housing.

A conduit 26, forming a passage 27, connects intake port 12 with an aperture 28 in the upper portion of end 22 of the trap compartment 15 and a similar conduit 29, forms a passage 30 connecting outlet port 13 with an aperture 31 in the upper portion of the end 23 of trap compartment 15. The cross sectional area of entrance and exit apertures 28 and 31 is substantially equal to that of intake port 12 and outlet port 13 but the aperture is of greater width and less height than the ports. The side walls 32 and 33 of a conduit such as 26 preferably diverge, and the top and bottom walls 34 and 35 preferably converge, as they approach compartment 15 in order to prevent eddying or other disturbance in the flow of the fluid.

Trap compartment 15 is equal in width to the width of apertures 28 and 31 but is considerably greater in height so that the cross sectional area of the compartment is greater than that of ports 12 and 13. Just below the lower edges 37 and 38 of apertures 28 and 31, I provide guide tracks 39 and 40 which extend across 15 and consist of a pair of flanges integral with the housing and projecting into compartment 15.

A magnetic plate 50 is slidably mounted in tracks 39 and 40 so that it can be removed for cleaning, through an opening such as 18 or 19, when cover plates 20 and 21 are unbolted or otherwise removed. Plate 50 comprises permanent magnets 51, each having its opposite poles in contact with bars 52 and 53, the bars being separated by and supported by suitable insulating and supporting members 54. The magnetic surface 55 of plate 50 forms a floor for compartment 15, and together with top 16 and sides 20 and 21 forms a fluid conduit of the same cross sectional area as apertures 28 and 31. The entire plate 50 thus forms a partition intermediate of the height of trap compartment 15, in the nature of a false bottom above bottom 17, and is entirely enclosed within trap compartment 15.

In Figs. 3 and 4, I show a modified form of housing B, having a central trap compartment 115, apertures 128 and 131 and magnetic plate 150 all corresponding to parts 15, 28, 31 and 50 of A. Housing B includes however a by-pass conduit 170, which directly connects intake ports 112 and 113 and is of substantially the same cross sectional area therewith although wider and more shallow.

Cylindrical recesses 171 and 172 are provided in B, proximate to, or in continuation of, ports 112 and 113 and valves 173 and 174 in tubular form are revolubly mounted therein, each valve having a central shaft such as 176 projecting outside the housing. A pulley such as 178 on each shaft such as 176 is connected by a belt 179 or 189 to a pulley such as 182 on shaft 181 centrally located in the upper exterior of B. The turning of handle 180 will thus revolve each valve 173 and 174 simultaneously.

An oppositely disposed pair of elongated apertures 182 and 183 is provided in each valve 173 or 174 so located that fluid can be admitted to passage 127, compartment 115 and passage 130 or can be diverted therefrom into by-pass conduit 170 by turning handle 180, when the magnetic plate 150 is to be removed for cleaning.

As in the form of my device shown in Figs. 1 and 2, the magnetic plate 150 forms a false bottom, intermediate of chamber 115, and can be slidably removed through a side opening 117 in housing B by removing cover plate 120.

I claim:

In a magnetic separator, a housing having an intake port and an outlet port of equal cross sectional area arranged for connection in a fluid pipe system, a central elongated compartment of greater cross sectional area than said ports and having elongated compartment openings in the sides thereof; conduits in said housing forming passages with gradually diverging side walls and gradually converging top and bottom walls from each port to entrance and exit apertures in the upper portion of each end of the compartment, each aperture being of greater width and less height than said ports but of substantially equal cross sectional area therewith; oppositely disposed guide tracks each extending across said compartment below the aperture at each end; a flat magnetic plate slidably mounted in said guide tracks forming a floor extending across the compartment, the cross sectional area of the compartment above said floor plate being substantially equal to the cross sectional area of the ports and apertures and cover plates removably mounted on said housing over the compartment openings.

BRUNO E. PREVOST.

References Cited in the file of this patent

UNITED STATES PATENTS

| Number | Name | Date |
| --- | --- | --- |
| 551,044 | Park | Dec. 10, 1895 |
| 581,101 | Brown | Apr. 20, 1897 |
| 2,288,264 | Byrd, Jr. | June 30, 1942 |
| 2,464,628 | Willard | Mar. 15, 1949 |